(12) United States Patent
Graves, Jr. et al.

(10) Patent No.: US 10,320,905 B2
(45) Date of Patent: Jun. 11, 2019

(54) HIGHLY AVAILABLE NETWORK FILER SUPER CLUSTER

(71) Applicant: Oracle International Corporation, Redwood Shores, CA (US)

(72) Inventors: Donald Allan Graves, Jr., Nashua, NH (US); Frederick S. Glover, Hollis, NH (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 729 days.

(21) Appl. No.: 14/873,541

(22) Filed: Oct. 2, 2015

(65) Prior Publication Data

US 2017/0097941 A1    Apr. 6, 2017

(51) Int. Cl.
| | |
|---|---|
| *G06F 17/30* | (2006.01) |
| *H04L 29/08* | (2006.01) |
| *G06F 3/06* | (2006.01) |
| *G06F 11/00* | (2006.01) |
| *H04L 29/14* | (2006.01) |
| *H04L 29/12* | (2006.01) |

(52) U.S. Cl.
CPC ............ *H04L 67/1095* (2013.01); *G06F 3/06* (2013.01); *G06F 11/00* (2013.01); *H04L 67/1002* (2013.01); *H04L 67/1097* (2013.01); *H04L 69/40* (2013.01); *H04L 61/103* (2013.01); *H04L 67/1008* (2013.01)

(58) Field of Classification Search
None
See application file for complete search history.

(56) References Cited

U.S. PATENT DOCUMENTS

| | | |
|---|---|---|
| 6,397,255 B1 | 5/2002 | Nurenberg |
| 6,944,785 B2 | 9/2005 | Gadir et al. |
| 7,089,293 B2 | 8/2006 | Grosner et al. |
| 7,480,737 B2 | 1/2009 | Chauffour |
| 7,574,499 B1 | 8/2009 | Swildens et al. |
| 8,417,678 B2 | 4/2013 | Bone et al. |
| 8,463,788 B2 | 6/2013 | Bandyopadhyay et al. |
| 2003/0126200 A1 | 7/2003 | Wolff |
| 2004/0243709 A1 | 12/2004 | Kalyanavarathan et al. |

(Continued)

OTHER PUBLICATIONS

Glover, U.S. Appl. No. 13/277,910, filed Oct. 20, 2011, Notice of Allowance dated Jun. 22, 2017.

(Continued)

*Primary Examiner* — Anhtai V Tran
(74) *Attorney, Agent, or Firm* — Hickman Palermo Becker Bingham LLP

(57) ABSTRACT

Techniques are provided for processing file system requests using a super cluster of clusters of nodes. Mirror file systems for processing the requests are exported through multiple clusters in the super cluster. A cluster may be assigned to an active or passive role for processing file system requests for a set of mirror file systems. A super cluster bundle, or mapping between a cluster in the super cluster and a file system resource on the set of mirror file systems, is created to process the file system requests. The super cluster bundle represents an amount of work assigned to the cluster. A super cluster bundle is reassigned from one cluster to another in response to a failover, or in response to a load balancing determination.

22 Claims, 5 Drawing Sheets

(56) References Cited

U.S. PATENT DOCUMENTS

| | | |
|---|---|---|
| 2004/0260745 A1 | 12/2004 | Gage et al. |
| 2005/0273571 A1 | 12/2005 | Lyon |
| 2007/0192444 A1 | 8/2007 | Ackauy et al. |
| 2008/0215718 A1 | 9/2008 | Stolorz et al. |
| 2008/0256183 A1 | 10/2008 | Flynn et al. |
| 2009/0006792 A1* | 1/2009 | Federwisch ....... G06F 17/30067 711/162 |
| 2009/0037367 A1* | 2/2009 | Wein ..................... G06F 9/5061 |
| 2010/0332664 A1 | 12/2010 | Yevmenkin et al. |
| 2013/0174177 A1* | 7/2013 | Newton .............. H04L 67/1008 718/105 |
| 2014/0325256 A1* | 10/2014 | Lambert ............. G06F 11/2094 714/4.11 |

OTHER PUBLICATIONS

Glover, U.S. Appl. No. 13/277,910, filed Oct. 20, 2011, Office Action, dated Dec. 16, 2016.

* cited by examiner

HIGHLY AVAILABLE NETWORK FILER SUPER CLUSTER

FIELD OF THE INVENTION

The present invention relates to file systems and, more particularly, to managing clusters of nodes connected to one or more file systems.

BACKGROUND

Current network file servers export file systems to many clients. These file systems are limited in availability in that, when a node serving the file system goes down, no new requests are serviced until the node comes back up and begins to serve the file system again. In one possible approach for providing a highly available network file system, two nodes each serve different file systems. If one node goes down, then the other node assumes the export of the failed node's file system(s). However, a client must be configured to mount the same file system through multiple nodes. This is referred to as "multiple mount points." In this way, a client must be configured to know when a node goes down in order to attempt accessing the same data through another mount point (i.e., the other node).

In addition, nodes can easily get overloaded processing I/O from clients. Since I/O may take over the system, using all available network and storage bandwidth, other clients may find themselves starved for I/O, waiting for small windows of time to get the information they need back from the network file server.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
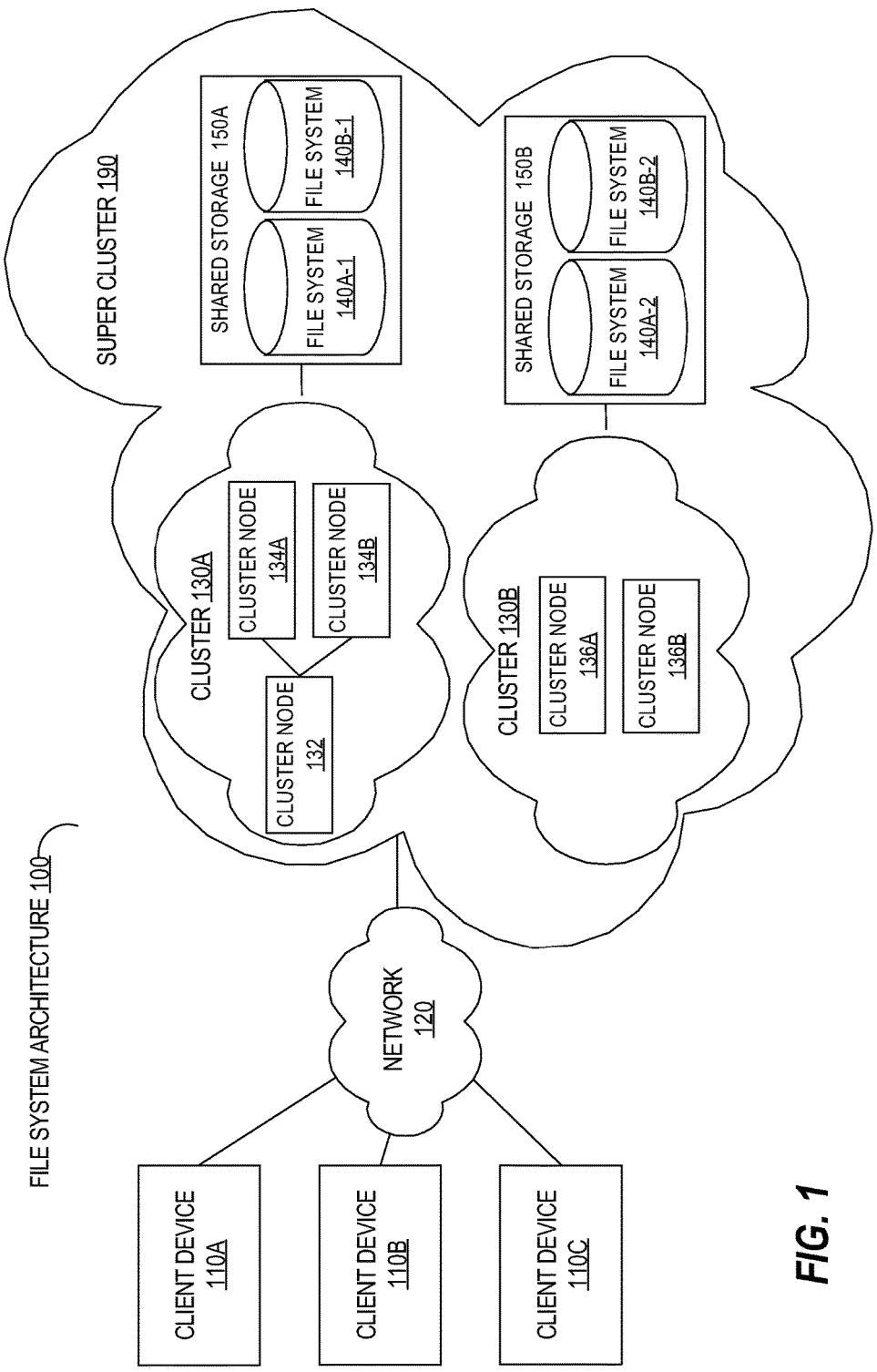
FIG. 1 is a block diagram that depicts an example file system architecture, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for a super cluster of clusters processing file system requests that target one or more sets of mirror file systems exported by the cluster. "Super cluster" refers herein to an aggregation of clusters of nodes, where one cluster of nodes is designated as an active cluster for processing file system requests for a particular file system and another cluster of nodes is designated as a standby cluster of nodes for processing file system requests for the mirror file system of the particular file system.

Each file system in a set of mirror file systems is hosted on a different shared storage, which is connected to a different cluster of nodes in the super cluster. Each file system is exported through nodes of a cluster to which the shared storage that hosts the file system is connected. As file system requests are processed by the super cluster, each cluster is assigned zero or more super cluster bundles, each of which represents an amount of work for nodes in the cluster to process zero or more of the received file system requests. Subsequently, each node in the cluster is assigned to zero or more bundles based on the zero or more super cluster bundles. In one implementation, a single node of the cluster receives all file system requests that are routed to the cluster in the super cluster. In another implementation, file system requests are sent to cluster nodes without going through an intermediate node in the cluster that is responsible for routing the requests. The cluster nodes in a super cluster may be connected through a sub-network for inter cluster communication to privately communicate regarding processing of the file system requests, in an embodiment.

Embodiments of the invention are not limited to any particular network file system protocol. Examples of network file system protocols include NFS (Network File System), GFS (GOOGLE® File System), and CIFS (Common Internet File System), also known as Server Message Block (SMB).

File System Architecture

In an embodiment, client devices may access a super cluster by accessing individual clusters of the super cluster. The access to a cluster of the super cluster may depend on the architecture of the cluster according to embodiments.

According to one embodiment, a cluster of nodes of a super cluster is associated with a single namespace, i.e. cluster nodes that export a file system of the super cluster are represented to client devices by a single name/address corresponding to a single node of the cluster. In other words, using a single name/address, client devices access one or more file systems that are exported by the cluster of nodes as if the client devices are interacting with a single node. The fact that there are a cluster of nodes, with different addresses, that are managing file system requests is transparent to the client devices. Thus, each file system exported by the cluster of nodes (there may be only one file system) is accessed through a single address associated with a routing node. A non-limiting examples of an address include an internet address (IP address), a media access control (MAC) address, a host name and a fully qualified domain name (FQDN). Each file system request from that client device is sent using that address as the destination, regardless of how many nodes are currently in the cluster, how many nodes have been removed from the cluster, and how many nodes have been added to the cluster.

According to another embodiment, a cluster of nodes of a super cluster is associated with multiple namespaces, i.e.

cluster nodes that export a file system of the super cluster are represented to client devices by their respective names/addresses. In other words, client devices can access individual nodes of the cluster and interact ("directly") with those nodes, using the respective addresses of those nodes, as opposed to directing all file system requests to a single node, such as routing node in the single namespace implementation described previously. Thus, the client devices can be aware of each cluster node's address and can interact directly with the address.

FIG. 1 is a block diagram that depicts an example file system architecture 100, according to an embodiment. File system architecture 100 comprises client devices 110A-C, network 120, super cluster 190, clusters 130A-B, cluster nodes 132, 134A-B and 136A-B, shared storage 150A-B, and file systems 140A/B-1/2. Although only three client devices 110A-C are depicted, other embodiments may include more or less than three. Similarly, although only two file systems per shared storage are depicted, 140A-1/2 and 140B-1/2, other embodiments may include more or less than two.

Client devices 110A-C are configured to generate and transmit file system requests that are sent over network 120 and directed to super cluster 190 and processed against one or more of file systems 140A/B-1/2. Examples of such file system requests are data read requests and/or data write requests. One or more client applications might execute on each of client devices 110A-C. Such client applications initiate the file system requests, which are generated by a file system client (e.g., NFS client) executing on a client device and sent to super cluster 190.

Super cluster 190 may contain more than one file system that may be able to process a file system request. For example, file system 140A-2 may also be able to process a file system request against file system 140A-1 because file system 140A-2 may contain a replica of data in file system 140A-1. Similarly, file system 140B-2 may contain a replica of data in file system 140B-1, and thus, a file request against file system 140B-1 may be processed by file system 140B-2 or vice versa.

The file systems that are attached to different clusters and may process the same file system request are referred herein as mirror file systems. Mirror file systems may process the same file system request because the mirror file systems contain the replicas of the same "file system resources." File system resource is any resource that resides within a file system such as a file, file metadata and directory data. A file system request may identify one or more file system resources, and since those one or more file system resources may concurrently reside on mirror file systems, each of the mirror file systems may be able to process the file system request. In a related embodiment, mirror file systems may have the same file system type. Non limiting examples of file system types are File Allocation Table 32 bit (FAT32), New Technology File System (NTFS), Third Extended File System (EXT3), Hierarchical File System Plus (HFS Plus).

Network 120 comprises a communications network, such as any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

In an embodiment, Network 120 may include a subnetwork for inter cluster communication between clusters 130A-B in super cluster 190. For example, a virtual local area network (VLAN) may be setup between cluster nodes of clusters 130A-B. Communication tagged for the VLAN will not be accessible to other nodes attached to Network 120. Therefore, cluster nodes of super cluster 190 may communicate privately using the VLAN.

Although only two clusters 130A-B are depicted as part of super cluster 190, other embodiments may include more than two. Each cluster is configured to process file systems requests from the respective cluster's shared storage 150A-B for mirror file systems 140A-1/2 and mirror file systems 140B-1/2.

Each set of mirror file systems in super cluster 190 is associated with a virtual address (referred to herein as a "VIP") in such a way that a file request with the VIP as the destination would be routed through Network 120 to a cluster node in super cluster 190 that can service the file request against a mirror file system from the set. The address is "virtual" because the assignment of a VIP to a cluster and to a cluster node in the cluster may change based on which cluster and cluster node are selected to service the mirror file systems associated with the VIP.

A cluster is assigned to a VIP when a cluster node in the cluster is assigned to the VIP. The cluster node assigned to the VIP is referred as "an access node" of the cluster. In a single namespace cluster, the access node for a cluster is the routing node. In a multiple namespace cluster, the access node for a cluster can be any of the cluster nodes. At least one file system in each set of mirror file systems may be exported through multiple clusters 130A-B in super cluster 190 (e.g., at different points in time). For example, cluster 130A may be assigned to a VIP associated with mirror file systems 140A-1/2 at time 10, and thus, exports file system 140A-1. Later, at time 20, the VIP is assigned to cluster 130B and thus, assigned to one of cluster nodes 136A-B. Thus, each file system request for mirror file system 140A-1/2 sent to the VIP would be routed to the one of cluster nodes 136A-B, instead of cluster nodes in cluster 130A. Accordingly, file system 140A-2 from mirror file system 140A-1/2 would process the file system requests.

Client devices 110A-C may discover VIP though a DNS lookup request of a "hostname." Hostname is a domain name that is assigned to a file system of a super cluster to identify the file system on Network 120. After discovering the file system address (VIP), client devices 110A-C send file systems requests that include either the VIP or the hostname as the destination address. When the hostname is used, Network 120 translates the hostname to the VIP through DNS lookup. Network 120 routes the file system requests to the appropriate cluster node of cluster 130A-B, which is associated (e.g., in an ARP table of a router) with the VIP.

In an embodiment, a cluster in a super cluster may be configured to be a single namespace cluster. Single namespace clusters are described in U.S. patent application Ser. No. 13/277,910, filed Oct. 20, 2011, (referred herein as "Cluster Application") the contents of which are incorporated herein by reference. An example of single namespace cluster is cluster 130A. Cluster 130A includes routing node 132 and cluster nodes 134A-B. Although only two cluster nodes 134A-B are depicted, other embodiments may include more than two. Each of cluster nodes 134A-B includes one or more processors and memory. Also, each of cluster nodes 134A-B executes at least one file system server that is configured to export one or more of file systems 140A/B-1, receive file system requests from routing node 132, and access data that is stored in the file system(s) the cluster exports. For ease of explanation, it is presumed that each of cluster nodes 134A-B executes a single file system server and that the actions that are performed by a file system server are attributed to the cluster node that executes the corresponding file system server.

If super cluster 190 supports multiple file system protocols, then cluster 130A needs to support the multiple file system protocols. Thus, each cluster node of cluster 130A would need to run multiple processes (e.g., one process per protocol) in order to service requests conforming to those protocols. For example, if cluster 130A supports CIFS and NFS, then each of cluster nodes 134A-B would execute an SMB process and a NFSD process, respectively. However, routing node 132 is not required to run multiple processes. This is because routing typically occurs at a lower level than the servicing of file system protocols. Routing node 132 only needs to examine an in-coming packet in order to direct the packet to the proper cluster node. The packet indicates the file system and an export type.

At least one of file systems 140A/B-1 is exported through multiple nodes in cluster nodes 134A-B. In other words, multiple cluster nodes 134A-B are configured to access shared storage 150A on which one or more of file systems 140A/B-1 reside. In an embodiment, shared storage includes one or more physical storage disks that may be provisioned into one or more logical disks, LUNs. In a related embodiment, each LUN may have a different file system installed and thus, a single storage disk may be partitioned into more than one LUNs, each of which may have different file systems assigned.

Each file system request that targets one of file systems 140A/B-1 (that are exported by super cluster 190) is sent to routing node 132 (as opposed to any of cluster nodes 134A-B, each of which may be associated with different addresses). Although depicted as a node or computing device that is separate from cluster nodes 134A-B, routing node 132 may include the same functionality as one of cluster nodes 134A-B. Routing node 132 is also different than each of cluster nodes 134A-B in that routing node 132 routes a client request to one of multiple nodes in the cluster based on one or more criteria or factors (e.g., current load of each node in cluster nodes 134A-B).

In an embodiment, if routing node 132 is "removed" from the cluster 130A (e.g., routing node 132 crashes, loses power, or is shut down), then another node in the cluster 130A takes over the role of routing node. The other node in cluster 130A may be one of cluster nodes 134A-B or a separate "stand-by" node that assumes the role of routing node 132.

In an embodiment, routing node 132 may be assigned to a VIP, to export one of file systems 140A/B-1. Client devices 110A-C may discover the VIP by performing a DNS lookup of the super cluster hostname, or by directing file system requests to the super cluster hostname, and Network 120 translating the requests based on the DNS lookup to the VIP. Routing node 132 receives those file requests and forwards the file requests to cluster nodes 134A-B. The routing of a file system request within a single namespace cluster is further described in Cluster Application. Other aspects of a single namespace cluster, such as load balancing, performance tuning and node management, are also described in Cluster Application.

In another embodiment, a cluster in a super cluster may be configured to be a multiple namespace cluster. Multiple namespace clusters are described in Cluster Application. An example of multiple namespace cluster is cluster 130B. In the multiple namespace cluster configuration such as cluster 130B, client devices can access individual nodes of the cluster and interact ("directly") with those nodes, as opposed to directing all file system requests to a single node, such as routing node 132 in the single namespace implementation described previously. Thus, the client devices can be aware of each node in the cluster.

Cluster 130B includes cluster nodes 136A-B. Although only two cluster nodes 136A-B are depicted, other embodiments may include more or less than two. Super cluster 190 may configure any node of cluster nodes 136A-B to process file systems requests against one or more of file systems 140A/B-2 of shared storage 150B. At least one of file systems 140A/B-2 may be exported through multiple nodes in cluster nodes 136A-B (e.g., at different points in time). Depending on which of nodes 136A/B is the access node for the cluster, file system requests that target one of file systems 140A/B-2 (that are exported by super cluster 190) are sent to either cluster node 136A or cluster node 136B.

Super Cluster Bundles

The amount of "work" assigned to each cluster (e.g., clusters 130A-B in super cluster 190) is referred to herein as a "super cluster bundle." A super cluster bundle is represented by a mapping or an association between a cluster in a super cluster and a file system resource. A super cluster bundle is represented or otherwise defined as a tuple: <CID, FSRID>, where "CID" refers to "cluster identifier" which identifies clusters 130A-B.

"FSRID" refers to "file system resource identifier" which identifies a file system resource on file systems 140A/B-1/2 exported by super cluster 190. FSRID contains the necessary information for a compute node to retrieve the identified file system resource from a file system. FSRID may include information about a file or a directory or metadata thereof. Non-limiting examples of FSRID may be an encoded file path or an encoded directory path. Additionally, information on a type of operation to be performed on the file system resource such as read/write/modify may also be included in FSRID. Since file systems 140A-1/2 are mirror file systems, a single FSRID identifies one or more file system resources on both file system 140A-1 and file system 140A-2. Similarly, a single FSRID may identify one or more file system resources on both mirror file systems 140B-1 and 140B-2.

In a related embodiment, a super cluster bundle also includes a file system protocol (referred to as an "export"). Two file system requests may target the same file system but use a different export or file system protocol. Thus, a super cluster bundle may be thought of as a tuple: <CID, export, FSRID>.

Thus, a super cluster bundle represents an assignment of work to a cluster. For example, two super cluster bundles may be assigned to cluster 130A and thus, to cluster nodes 134A-B, while five super cluster bundles may be assigned to cluster 130B and thus, to cluster nodes 136A-B.

The assignment of super cluster bundles is performed by super cluster bundle management software executing on nodes of clusters in super cluster 190. The super cluster bundle management software is configured to make intelligent decisions regarding load balancing, fail over, and responding to the removal and addition of clusters from/to super cluster 190. The super cluster bundle management software is also referred herein as "super cluster software."

Active-Standby Configuration

In an embodiment, super cluster 190 is configured in an active-standby configuration. In the active-standby configuration, a single cluster in a super cluster assumes the active role to service requests for file system resources on a file system, while other clusters in the super cluster that have mirror file systems of the file system, assume the standby role. Once a cluster in the super cluster assumes the active role, the active cluster receives all the file system requests for file system resources of mirror file systems from client devices. In a related embodiment, a cluster in a super cluster may be active for one set of mirror file systems and a standby for another set of mirror file systems. For example, in super cluster 190, cluster 130A may be assigned to be the active cluster for the set of mirror files systems 140A-1/2, and thus, cluster 130B would be a standby cluster for the set. At the same time, cluster 130B may be assigned to be the active cluster for the set of mirror file systems 140B-1/2, and cluster 130A would serve as a standby cluster for the set.

The assignment of roles and bundles is performed by the super cluster software of a super cluster. In an embodiment, to assign an active role to cluster 130A for mirror file systems 140A-1/2, the super cluster software may cause the mapping for a VIP of mirror file systems 140A-1/2 to be updated to a physical address of the access node of cluster 130A, routing node 132. This mapping may be stored in an ARP (i.e., Address Resolution Protocol) table in a switch or router in Network 120. In this way, any future file system requests that include the VIP of the mirror files systems as the destination will be routed to cluster 130A through its routing node, cluster node 132.

Once routing node 132 receives the file requests, the super cluster software generates super cluster bundles and assigns them to cluster 130A. Bundles are then generated and assigned to the nodes of cluster 130A based on the techniques described in the Cluster Application. In one embodiment, the bundle management software of cluster 130A generates bundles based on the super cluster bundles for the file system requests (bundle management software is further described in Cluster Application). To do so, the bundle management software may replace the CID of a super cluster bundle with the CNID of the cluster node to which the bundle management software has assigned the bundle. Also, the bundle management software may replace an FSRID with the corresponding FSID of the mirror file system, on which the file system resource identified by the FSRID resides. In an embodiment, FSID may include similar information about a file system resource as FSRID. Alternatively or additionally, FSID may include information about the particular file system on which the file system resource is maintained. Bundles, CNIDs and FSIDs are further described in Cluster Application. In one embodiment, the bundle management software may be a component of the super cluster software.

The assignment of active role may be performed similarly for a multiple namespace cluster, such as cluster 130B. In such a scenario, the VIP is mapped to either cluster node 136A or cluster node 136B. The bundle management software may then determine the access node of cluster 130B based on the techniques described in Cluster Application.

To keep track of the role assigned to a cluster for mirror file systems, the super cluster software may maintain a cluster mapping, in an embodiment. The cluster mapping may map clusters of a super cluster to mirror file systems and include information on the role of the clusters for the mirror file systems, as well as information about the access nodes of the clusters currently assigned to access the mirror file systems (including the logical and physical addresses of the access nodes). Table 1 represents the cluster mapping for super cluster 190 according to an embodiment.

TABLE 1

Cluster Mapping for Super Cluster 190

| Mirror File Systems | Role | Cluster | Access Node | Cluster Node | Access Node Address |
|---|---|---|---|---|---|
| File systems 140A-1/2 | Standby | Cluster 130A | Yes | Cluster node 132 | D4-3D-7E-99-08-36 |
| File systems 140A-1/2 | Active | Cluster 130B | Yes | Cluster node 136A | D4-3D-A3-B5-C6-D6 |
| File systems 140A-1/2 | Active | Cluster 130B | No | Cluster node 136B | D4-3D-A3-A5-C7-D8 |
| File systems 140B-1/2 | Active | Cluster 130A | Yes | Cluster node 132 | D4-3D-7E-99-08-36 |
| File systems 140B-1/2 | Standby | Cluster 130B | Yes | Cluster node 136A | D4-3D-A3-B5-C6-D6 |
| File systems 140B-1/2 | Standby | Cluster 130B | No | Cluster node 136B | D4-3D-A3-A5-C7-D8 |

Synchronizing Mirror File Systems

Mirror file systems attached to different clusters in a super cluster are synchronized. The term "synchronized" refers to maintaining copies of the same file resources in the same state between mirror file systems, such that when a copy of a file system resource is changed on a file system, that change is replicated to the respective copy on the mirror file systems of the file system. The change may include adding of a file resource, such as a file or directory creation; modifying of a file resources, such as modifying data or metadata of a file or changing directory structure; deleting of a file resource, such as a file or directory deletion.

Figure 2:
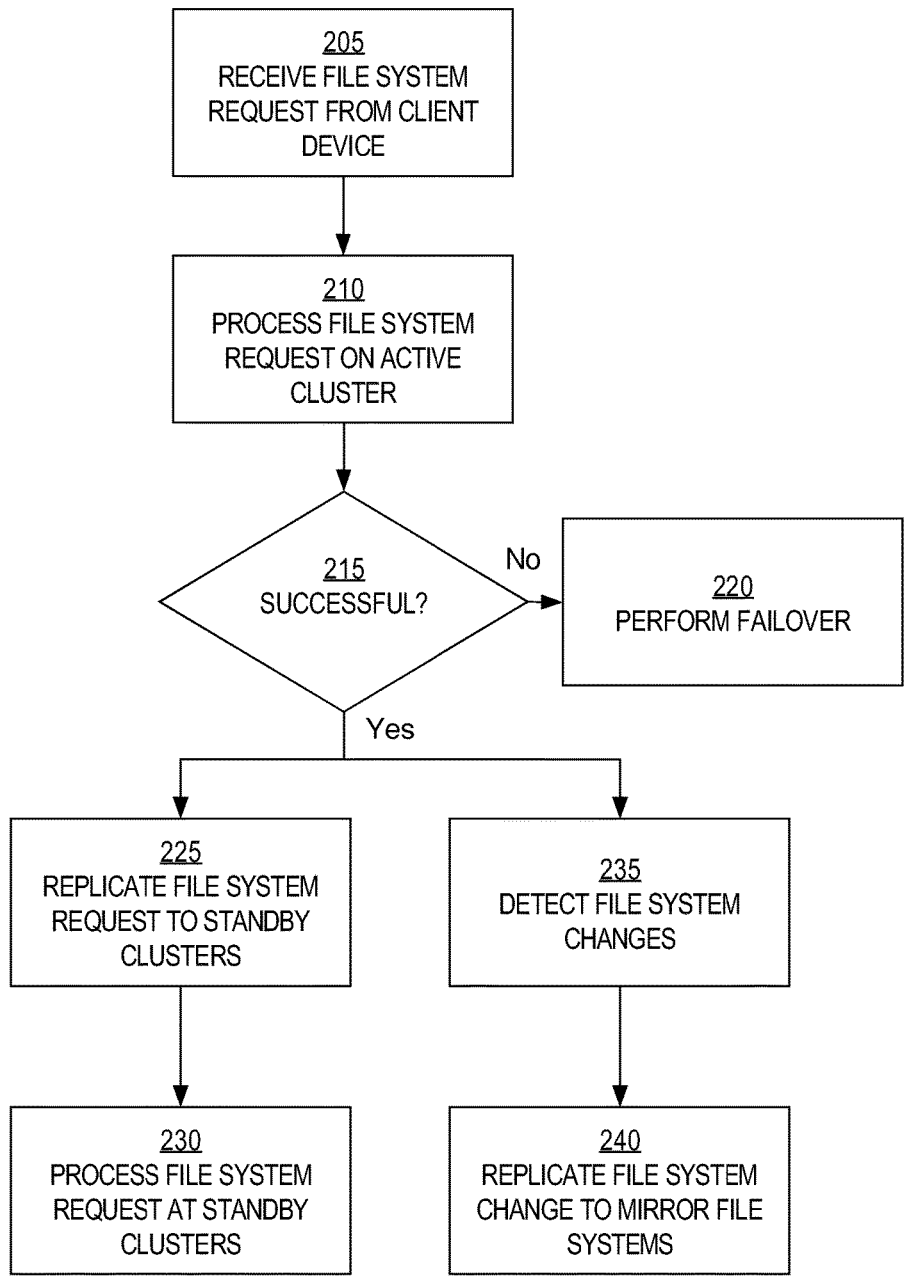
FIG. 2 is a flow diagram that depicts a process for processing a file system request, according to an embodiment of the invention.

FIG. 2 is a flow diagram that depicts a process for synchronizing mirror file systems according to an embodiment. At block 205, super cluster 190 receives a file system request for a file system from a client device. At block 210, the super cluster software generates and assigns one or more super cluster bundles to the active cluster to processes the file system request. The bundle management software determines the cluster node(s) to process the file system request and generates and assigns bundles to the cluster node(s) to process the file system request.

For example, if the file system request received at block 205, is for a file system resource on mirror file systems 140A-1/2, then, according to the cluster mapping in Table 1, the request would be routed to cluster 130B, which is the active cluster for mirror file systems 140A-1/2. More specifically, the request would be routed to cluster node 136A, which is currently the access node for cluster 130B (as denoted in the Table 1's Access Node column). Whether cluster node 136A or cluster node 136B processes the request depends on bundle assignments within cluster 130B by the bundle management software at block 210.

The bundle management software may assign the corresponding bundles for the file request to cluster node 136A to process. If cluster node 136A is unsuccessful in processing the file request at block 210, then, in one embodiment, the bundle management software may perform a fail over to cluster node 136B to process the file request according to techniques described in Cluster Application. If, at block 215, super cluster software determines that cluster 130B was unsuccessful at processing the file system request, then at block 220, the super cluster software may perform a fail over to cluster 130A based on the techniques described further below.

If, at block 215, the super cluster software determines that the file system request was successfully processed for file system 140A-2, the super cluster software replicates the changes of file system 140A-2 to the mirror file systems of the standby clusters at block 225. The super cluster software may determine from the cluster mapping that cluster 130A is a standby cluster for mirror file systems 140A-1/2. The super cluster software may then replicate the super cluster bundles and route the replicated super cluster bundles to standby cluster 130A.

At block 225, standby cluster 130A receives the assigned super cluster bundles, and processes the file request against mirror file system 140A-1 using the techniques described above for the super cluster bundle processing at block 230. Once the change from the file request are made to file system 140A-1, file system 140A-1 becomes synchronized with mirror file system 140A-2 as of the receipt of the file system request by super cluster 190.

In another embodiment, instead of or in addition to the process performing blocks 225-230, the process may proceed to block 235, if the file system request was processed successfully at block 215. At block 235, a synchronization service that may run on any cluster nodes attached to mirror file systems, detects changes made to file system 140A-2 as a result of processing the file system request. At block 240, the synchronization service may replicate the changes to file system 140A-1 by routing the information about the changes to the synchronization service running on cluster nodes of cluster 130A. The information about the changes may be in form of directory/file level information or data block level information. Once the changes are applied to file system 140A-1, file system 140A-1 and file system 140A-2 are synchronized as of the receipt of the file system request.

Failover

Figure 3:
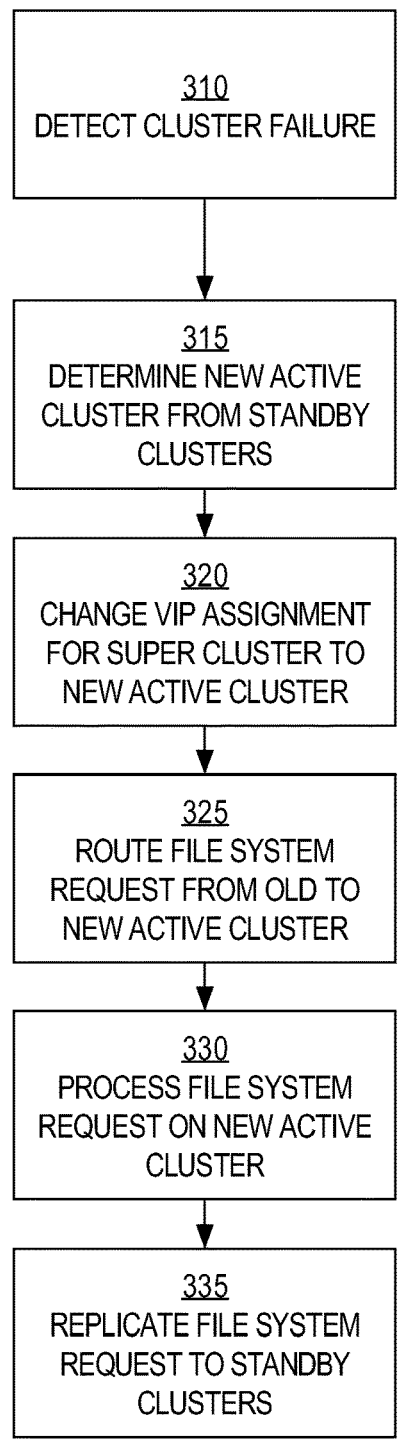
FIG. 3 is a flow diagram that depicts a cluster fail over in a super cluster, according to an embodiment of the invention.

FIG. 3 is a flow diagram that depicts a cluster fail over in a super cluster such as super cluster 190, in an embodiment. At block 310, the super cluster software of the super cluster may detect a failure of an active cluster. For example, the cluster 130B may experience a failure due to a failure in shared storage 150B, where file systems 140A/B-2 reside. Another example of failure may be due to a simultaneous compute node failures of cluster node 136A and cluster node 136B. If any cluster node in super cluster 190 detects a failure, then a failover to cluster 130A is performed as described below. For example, the instances of the super cluster software running on cluster 130A may detect the failure by not receiving a response to a periodic message sent to the nodes in cluster 130B. In another example, the instance of super cluster software running on one or more cluster nodes in cluster 130B, may detect the failure itself and send messages about the failure to cluster nodes in cluster 130A.

At block 315, the super cluster software determines which standby clusters to fail over. In one embodiment, the super cluster software uses the cluster mapping to retrieve information on mirror file systems for which the failed cluster is active and to retrieve the standby clusters for the failed active cluster. Continuing with the example of failed cluster 130B, the super cluster software based on Table 1 information determines that cluster 130B has an active role in servicing file system requests for mirror file systems 140A-1/2. The standby role for the mirror file systems is assigned to cluster 130A based on the same mapping. Using this information, the super cluster software determines that the standby cluster for cluster 130B is cluster 130A.

At block 320, the VIP assignment for the mirror file systems is changed to a cluster node in the standby cluster. The file requests that have failed due to a failed cluster are repeated and then redirected to the access node of the new active cluster. Continuing with the above example, the super cluster software may cause the mapping for a VIP of mirror file systems 140A-1/2 to be updated to an address of the access node of cluster 130A, routing node 132. This mapping may be stored in an ARP (i.e., Address Resolution Protocol) table in a switch or router in Network 120. In this way, at block 325, any future file system requests that include the VIP of the mirror files systems as the destination will be routed to cluster 130A through its routing node, cluster node 132. Then, according to the techniques described in Cluster Application, either cluster node 134A or cluster node 134B will process the file system requests at block 330.

At block 335, the new active cluster begins replicating the file requests processed. In an embodiment, if the super cluster software continues to detect that the standby cluster is not able to process a file request, the super cluster software may queue super cluster bundles for the failed cluster. The super cluster software may then assign the super cluster bundles to the standby cluster, when the standby cluster is detected to be operational.

Load Balancing

In an embodiment, the super cluster software of a super cluster may also perform load balancing between the clusters of the super cluster. In the active/standby super cluster configuration, the load balancing techniques are similar to the fail over techniques described above. However, unlike the fail over, the load balancing is planned, i.e. the super cluster software determines that a particular standby cluster would be more "efficient" in processing file requests than the current active cluster of the super cluster. The "efficiency" is determined by analyzing the load of the active and standby clusters.

Figure 4:
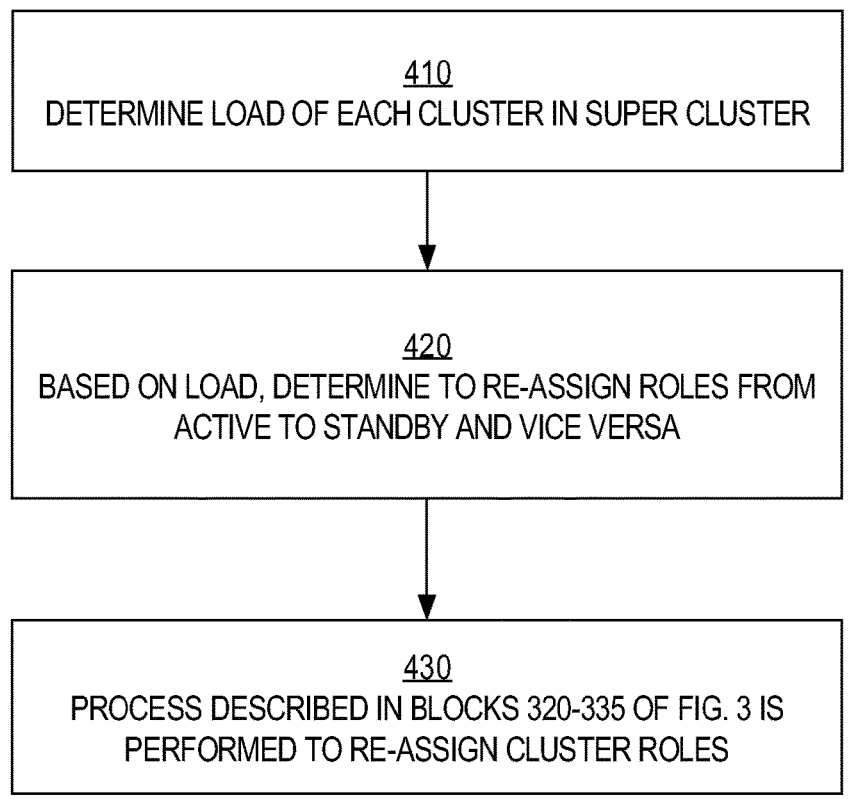
FIG. 4 is a flow diagram that depicts a process for load balancing a cluster of nodes, according to an embodiment of the invention.

FIG. 4 is a flow diagram that depicts a process for load balancing super cluster 190, according to an embodiment. The process may be performed by load balancing software executing on one or more of cluster nodes in super cluster 190 and in one embodiment, the load balancing software may be a component of the super cluster software.

At block 410, the current load of each cluster in super cluster 190 is determined. The current load may be reflected in the number of super cluster bundles assigned to each cluster. Additionally or alternatively, the current load may be reflected by compute resources of each cluster node in the cluster. For example, the current load may be based on one or more of: the CPU usage of cluster nodes of each cluster, the memory usage of cluster nodes of each cluster, the I/O usage of cluster nodes of each cluster, and/or the type of file system requests currently being serviced or processed by cluster nodes in each cluster.

In a related embodiment, the current load of a cluster may be determined based on a ratio of super cluster bundles assigned to the cluster over compute resources of all cluster nodes in the cluster. Since the cluster nodes within a cluster may be load balanced according to techniques described in Cluster Application, the bundles from the assigned super cluster bundles may be equally distributed across the cluster nodes. Thus, the load of the cluster may be more accurately determined on the ratio to cluster resources basis rather than on the basis of total super cluster bundles assigned to the cluster. For example, if cluster 130B has nine super cluster bundles assigned, and each of cluster nodes 136A-B has two dual-core 3 GHz processors, then the load of cluster 130B may be determined to be nine over 12 GHz or three over 4

GHz. At the same time cluster 130A has three super cluster bundles assigned, and cluster nodes 134A and 134B each have two dual core processors 1 GHz each. Accordingly, the load of cluster 130A may be determined to be three over 8 GHz. Therefore, although cluster 130B has more super cluster bundles assigned than cluster 130A, when cluster resources are taken into account, cluster 130A and cluster 130B have the same load per processor resource.

The current load of each node in a cluster may be determined continuously or at regular intervals (e.g., every minute) and then aggregated to represent the current load of the cluster. Additionally or alternatively, the current load may be determined in response to the occurrence of certain events, such as after each new file system request.

At block 420, based on the load of each cluster in a super cluster, the super cluster software determines whether to re-assign roles for clusters in the super cluster. If a standby cluster for a set of mirror-file systems has less load than the active cluster for the set, then the super cluster software may determine to re-assign the active role to the standby cluster for the set of mirror file systems and assign the standby role to the previously active cluster. For example, if the super cluster software determines that cluster 130B has nine super cluster bundles assigned and is the active cluster for mirror file systems 140A-1/2, while cluster 130A has only two super cluster bundles assigned for file systems 140A-1 and 140B-1, then the super cluster software may assign the active role for mirror files systems 140A-1/2 from cluster 130B to cluster 130A.

At block 430, the super cluster software performs re-assignment of roles as described in blocks 320-325 of FIG. 3.

In another embodiment, if the super cluster software finds a cluster in a super cluster to have an excessive load, a cluster node may be added to the cluster according to techniques described in Cluster Application. The additional cluster node would seamlessly add resources to the cluster, and the super cluster software may re-calculate the load of the cluster based on the added resources.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
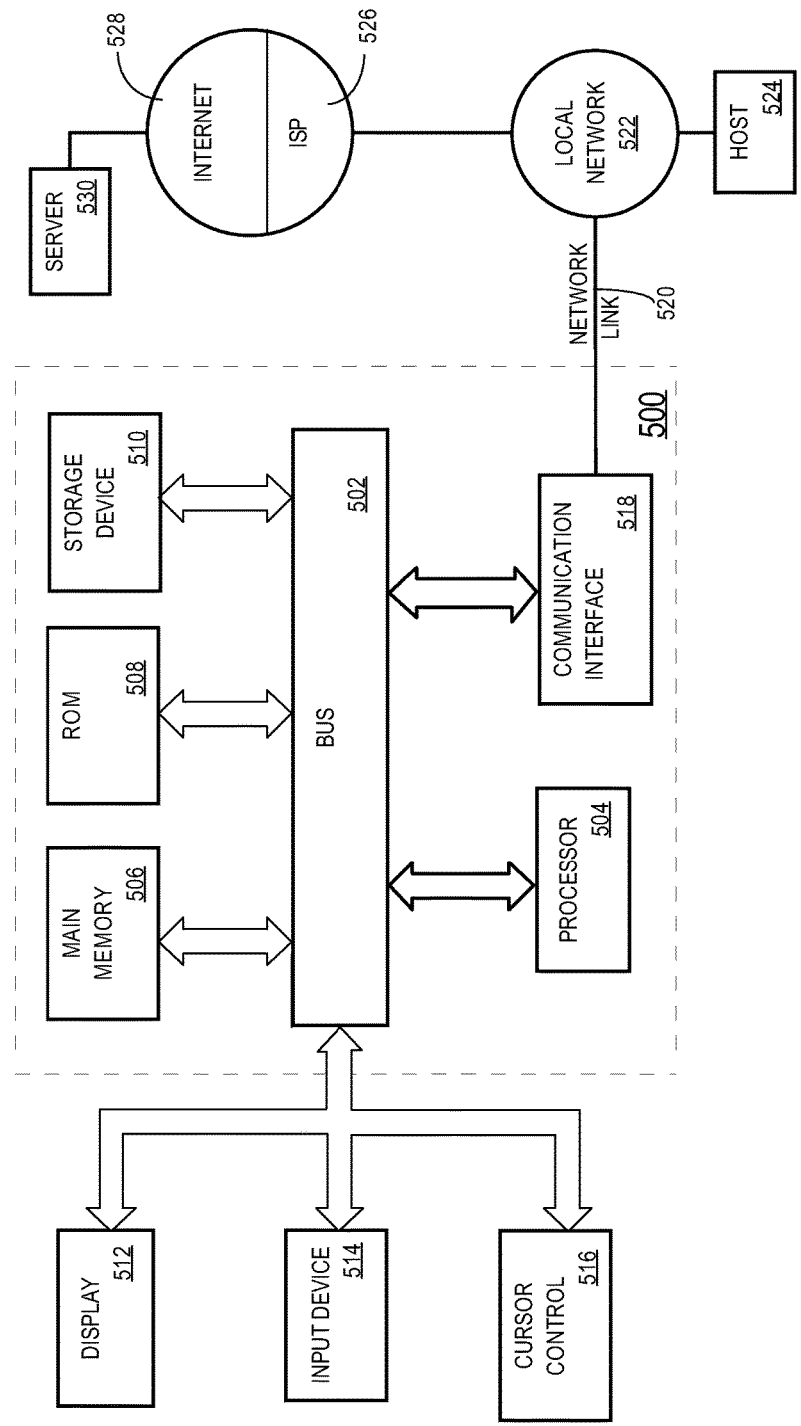
FIG. 5 is a block diagram that illustrates a computer system upon which an embodiment of the invention may be implemented.

For example, FIG. 5 is a block diagram that illustrates a computer system 500 upon which an embodiment may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, at a first cluster of nodes, a file system request for a first file;
   wherein each node in the first cluster of nodes has direct access to a first shared storage, on which a set of files is stored, and wherein the set of files includes the first file;
   wherein the first shared storage performs processing of requests for the set of files from a first plurality of nodes in the first cluster of nodes;
   wherein the first cluster of nodes is configured to replicate changes to the set of files, stored on the first shared storage, to a replica set of files stored on a second shared storage that each node in a second cluster of nodes, that is different from nodes in the first cluster of nodes, has access to;
   wherein the second shared storage performs processing of requests for the replica set of files from a second plurality of nodes in the second cluster of nodes;
   determining that the second cluster of nodes is to process the file system request;
   receiving, at a node in the second cluster of nodes, the file system request;
   in response to receiving the file system request, processing, at the node in the second cluster of nodes, the file system request for a second file, in the replica set of files, that is a copy of the first file and is stored on the second shared storage; and
   wherein the method is performed by one or more computing devices.

2. The method of claim 1:
   wherein the first shared storage hosts a first file system and the first plurality of nodes from the first cluster of nodes export the first file system;
   wherein the second shared storage hosts a second file system and the second plurality of nodes from the second cluster of nodes export the second file system, and
   wherein the first file system and the second file system are mirror file systems.

3. The method of claim 2, wherein the mirror file systems are exported using at least one of following file system protocols: Network File System (NFS), GOOGLE® File System (GFS), Common Internet File System (CIFS), or Server Message Block (SMB).

4. The method of claim 1, wherein determining that the second cluster of nodes is to process the file system request is based on comparing a first load of the first cluster of nodes with a second load of the second cluster of nodes.

5. The method of claim 4, wherein the first load is based on work assigned to the first cluster of nodes to process file system requests and wherein the second load is based on work assigned to the second cluster of nodes to process file system requests.

6. The method of claim 4,
   wherein the first load is based on at least one of:
      CPU usage of nodes in the first cluster of nodes,
      memory usage of nodes in the first cluster of nodes, or
      I/O usage of nodes in the first cluster of nodes; and
   wherein the second load is based on at least one of:
      CPU usage of nodes in the second cluster of nodes,
      memory usage of nodes in the second cluster of nodes, or
      I/O usage of nodes in the second cluster of nodes.

7. The method of claim 1, further comprising:
   detecting a failure that occurred at the first cluster of nodes;

in response to determining that the second cluster of nodes is to process the file system request, updating a particular address-to-address mapping from having an address of a node in the first cluster of nodes to an address of the node in the second cluster of nodes.

8. The method of claim 7, wherein the failure occurred at the first cluster of nodes detected by one or more nodes in the second cluster of nodes.

9. The method of claim 1, further comprising:
detecting a first failure at a first cluster node in the first cluster of nodes;
in response to detecting the first failure, updating a particular address-to-address mapping from having an address of the first cluster node in the first cluster of nodes to an address of a second cluster node in the first cluster of nodes;
detecting a second failure at the second cluster node in the first cluster of nodes;
in response to detecting the second failure, updating the particular address-to-address mapping from having the address of the second cluster node in the first cluster of nodes to an address of the node in the second cluster of nodes.

10. The method of claim 1, wherein the file system request for the first file is directed to an address of a mirror file system which, based on a particular address-to-address mapping, is mapped to an address of a node in the first cluster of nodes.

11. The method of claim 10, wherein the particular address-to-address mapping is stored in an address resolution protocol (ARP) table.

12. One or more non-transitory computer-readable media storing a set of instructions, which, when executed by one or more hardware processors, cause:
receiving, at a first cluster of nodes, a file system request for a first file;
wherein each node in the first cluster of nodes has direct access to a first shared storage, on which a set of files is stored, and wherein the set of files includes the first file;
wherein the first shared storage performs processing of requests for the set of files from a first plurality of nodes in the first cluster of nodes;
wherein the first cluster of nodes is configured to replicate changes to the set of files, stored on the first shared storage, to a replica set of files stored on a second shared storage that each node in a second cluster of nodes, that is different from nodes in the first cluster of nodes, has access to;
wherein the second shared storage performs processing of requests for the replica set of files from a second plurality of nodes in the second cluster of nodes;
determining that the second cluster of nodes is to process the file system request;
receiving, at a node in the second cluster of nodes, the file system request; and
in response to receiving the file system request, processing, at the node in the second cluster of nodes, the file system request for a second file, in the replica set of files, that is a copy of the first file and is stored on the second shared storage.

13. The one or more non-transitory computer-readable media of claim 12:
wherein the first shared storage hosts a first file system and the first plurality of nodes from the first cluster of nodes export the first file system;
wherein the second shared storage hosts a second file system and the second plurality of nodes from the second cluster of nodes export the second file system, and
wherein the first file system and the second file system are mirror file systems.

14. The one or more non-transitory computer-readable media of claim 13, wherein the mirror file systems are exported using at least one of following file system protocols: Network File System (NFS), GOOGLE® File System (GFS), Common Internet File System (CIFS), or Server Message Block (SMB).

15. The one or more non-transitory computer-readable media of claim 12, wherein determining that the second cluster of nodes is to process the file system request is based on comparing a first load of the first cluster of nodes with a second load of the second cluster of nodes.

16. The one or more non-transitory computer-readable media of claim 15, wherein the first load is based on work assigned to the first cluster of nodes to process file system requests and wherein the second load is based on work assigned to the second cluster of nodes to process file system requests.

17. The one or more non-transitory computer-readable media of claim 15,
wherein the first load is based on at least one of:
CPU usage of nodes in the first cluster of nodes,
memory usage of nodes in the first cluster of nodes, or
I/O usage of nodes in the first cluster of nodes; and
wherein the second load is based on at least one of:
CPU usage of nodes in the second cluster of nodes,
memory usage of nodes in the second cluster of nodes, or
I/O usage of nodes in the second cluster of nodes.

18. The one or more non-transitory computer-readable media of claim 12, wherein the set of instructions further includes instructions, which, when executed by the one or more hardware processors, cause:
detecting a failure that occurred at the first cluster of nodes;
in response to determining that the second cluster of nodes is to process the file system request, updating a particular address-to-address mapping from having an address of a node in the first cluster of nodes to an address of the node in the second cluster of nodes.

19. The one or more non-transitory computer-readable media of claim 18, wherein the failure occurred at the first cluster of nodes detected by one or more nodes in the second cluster of nodes.

20. The one or more non-transitory computer-readable media of claim 12, wherein the set of instructions further includes instructions, which, when executed by the one or more hardware processors, cause:
detecting a first failure at a first cluster node in the first cluster of nodes;
in response to detecting the first failure, updating a particular address-to-address mapping from having an address of the first cluster node in the first cluster of nodes to an address of a second cluster node in the first cluster of nodes;
detecting a second failure at the second cluster node in the first cluster of nodes;
in response to detecting the second failure, updating the particular address-to-address mapping from having the address of the second cluster node in the first cluster of nodes to an address of the node in the second cluster of nodes.

21. The one or more non-transitory computer-readable media of claim 12, wherein the file system request for the first file is directed to an address of a mirror file system which, based on a particular address-to-address mapping, is mapped to an address of a node in the first cluster of nodes.

22. The one or more non-transitory computer-readable media of claim 21, wherein the particular address-to-address mapping is stored in an address resolution protocol (ARP) table.

* * * * *